United States Patent Office 3,395,112
Patented July 30, 1968

3,395,112
NICKEL ORGANOPHOSPHITES AND POLYOLEFIN
RESIN STABILIZATION THEREWITH
Otto S. Kauder, Jamaica, N.Y., assignor to Argus Chemical Corporation, Brooklyn, N.Y., a corporation of New York
No Drawing. Filed Sept. 15, 1965, Ser. No. 487,614
15 Claims. (Cl. 260—45.75)

ABSTRACT OF THE DISCLOSURE

A stabilizer combination is provided for use in improving the resistance of olefin polymers, such as propylene polymers, to deterioration in physical properties on exposure to light and heat. The stabilizer combination contains a nickel organophosphite having at least one bivalent nickel atom ionically linked through oxygen to phosphorus, and having, per phosphite group, at least one organic radical linked through oxygen to phosphorus, and another olefin polymer stabilizer. The nickel organophosphite can be defined by the formula:

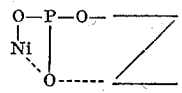

wherein one of the oxygens of the phosphite group is linked to nickel, and one of the oxygens of the phosphite group is linked to the organic radical Z, the other oxygen being linked either to nickel or to an organic radical, as indicated by the dashed lines.

In addition, olefin polymer compositions, such as propylene polymer compositions containing nickel organophosphites, are provided.

---

This invention relates to nickel monoorganophosphites, and to stabilizer compositions for polyolefins including nickel organophosphites as an essential component, and to a process for preparing such phosphites, and such stabilized polyolefin compositions, and more particularly, to nickel organophosphite stabilizer compositions for polypropylene and to a process for stabilizing propylene polymers employing such stabilizers.

Polypropylene is a tough, high-melting polymeric material, but in several respects its stability leaves much to be desired. The polymer shows a tendency to decrease rapidly in melt viscosity, and then to become brittle, when kept at elevated temperatures for the time required in milling, calendering, extrusion, injection molding and fiber-forming equipment. This deterioration is particularly serious when the polymer is worked in the molten state in the presence of oxygen, e.g., air. Polypropylene is also subject to deterioration in physical properties when exposed to light, particularly to ultraviolet light or sunlight, over long periods of time, and after such exposure has very poor resistance to heat. Shaped polymers show a tendency to discolor, to become distorted, to crack, and to powder around the edges upon exposure to sunlight and during aging, and especially when heated at moderately elevated temperatures as in an accelerated aging process, and again, the problem is accentuated in the presence of oxygen. In many cases, it is thought, this is due to residual melt catalyst, which is quite difficult to remove from the polymer.

Among the highly colored organonickel compounds that have been proposed are compounds containing carbon, hydrogen and oxygen, such as the nickel salts of phenols (green, Daly U.S. Patent No. 2,340,938); nickel salts of acetylacetone (green, French Patent No. 1,300,616); nickel salts of hydroxyethylated polyols (green, British Patent No. 959,043 to Ferro Corporation); nickel salts of o-hydroxy aromatic aldehydes or carboxylic acids (green, British Patent No. 945,050 to Hercules Powder Company); compounds containing carbon, hydrogen and nitrogen, such as the nickel salts of aliphatic polyamines (green, British Patent No. 945,050 to Hercules Powder Company); compounds containing carbon, hydrogen and sulfur, such as the nickel salts of aryl mercaptans Ar—XH and their selenium and tellurium analogs (maroon, Daly, U.S. Patent No. 2,340,938); compounds containing carbon, hydrogen, oxygen and nitrogen, such as the nickel salts of bis-salicyclidene ethylenediamines (golden brown); Burgess U.S. Patent No. 2,615,860; and nickel glyoximes (red, Belgian Patent No. 640,272); nickel salts of alpha-aminocarboxylic acids (green, Soeder U.S. Patent No. 3,102,107); nickel salts of o-hydroxyphenylbenzotriazoles (green, Matlack U.S. Patent No. 3,074,909); nickel salts of o-hydroxybenzylidenemonoamines, aminoacids or acylhydrazones (green, Matlack German Patent No. 1,147,753; nickel salts of alkylhydroxamic acids (green, Matlack French Patent No. 1,343,984); nickel salts of 1,2-oximinoketones (green, Matlack U.S. Patent No. 3,107,232); nickel complexes with 1,3-iminoketones (green, British Patent No. 954,050 to Hercules Powder Company); nickel salts of 8-hydroxyquinoline complexes with amines or epoxides (green, Matlack U.S. Patent No. 3,127,372); and nickel salts with aliphatic aminoalcohols (green, British Patent No. 945,050 to Hercules Powder Company); compounds containing carbon, hydrogen, oxygen and sulfur, such as the nickel salts of bis-alkylphenol sulfides, taken either alone (green, Daly U.S. Patent No. 2,340,938, Fuchsman U.S. Patents Nos. 2,971,940 and 2,971,941) or combined with alkylidenebis-alkylphenols (green, Dickson U.S. Patent No. 3,006,885) or with o-hydroxyphenylbenzotriazoles (green, Dickson U.S. Patent No. 3,074,910) or combined with cobalt dialkyldithiocarbamates (maroon, British Patent No. 948,502 to Sun Oil Company); nickel salts of bis-alkylphenol sulfoxides and sufones (Breslow U.S. Patent No. 3,072,601 and British Patents Nos. 956,102 and 958,830 to Hercules Powder Company); nickel salts of hydroxyethyl thioethers, alone or in combination with bis-alkyl sulfides (green, British Patent No. 959,043 to Ferro Corporation); compounds containing carbon, hydrogen, nitrogen and sulfur, such as the nickel salts of N,N-di-substituted dithiocarbamates (maroon, British Patent No. 948,501 to Sun Oil Company) and combinations thereof with bis-alkylphenol sufides (maroon, British Patent No. 948,502 to Sun Oil Company) and with cobalt derivatives of N,N-disubstituted dithiocarbamates (maroon, British Patent No. 948,504 to Sun Oil Company); compounds containing carbon, hydrogen, oxygen, nitrogen and sulfur, such as the nickel salts of amine complexes of bis-alkylphenol sulfides with benzophenones (green, British Patents Nos. 943,081 and 965,199 to American Cyanamid); and compounds containing carbon, hydrogen, oxygen, sulfur and phosphorus, such as nickel salts of dihydrocarbyl dithiophosphates (British Patent No. 945,050 to Hercules Powder Company).

A number of compounds have been suggested as stabilizers for polypropylene to improve its heat and light stability. The heat stabilizers most commonly used today are organic triphosphites, including the thiophosphites, phenols, and particularly the bisphenols such as 4,4'-thio-bisphenol, 4,4'-butylidene-bis-phenol, and Bisphenol A, as well as thiodipropionic acid esters, such as dilauryl thiodipropionate, and polyvalent metal salts of organic acids, such as zinc-2-ethyl hexoate. Stabilizer combinations of these types are disclosed in a variety of patents, including Belgian Patents Nos. 577,252 and 582,162, and British Patents Nos. 851,670 and 890,468. Light stabilizers commonly employed with the heat stabilizers include the 2-hydroxybenzophenones and various derivatives thereof.

Organonickel compounds have been proposed as light stabilizers for polyolefin resins. However, nickel compounds have presented difficulties in use, because they tend to depreciate the heat-stabilizing effectiveness of the other heat stabilizers in the composition, and in addition, because they tend to be highly colored, they introduce a strong color into the polymer composition, which is, of course, disadvantageous in many end uses.

Nickel forms two types of organic compounds, one type in which the nickel is attached to the organic radicals by coordinate bonds, and has an apparent valence of four, and one type in which the bonds are ionic, and nickel is bivalent. The first type is illustrated by the tetrakis (triorganophosphite) nickel compounds of U.S. Patent No. 3,152,158, issued Oct. 6, 1964 and the organonickel carbonyl complexes of British Patent No. 979,553 dated Jan. 6, 1965. However, only the compounds of the second type have been proposed as stabilizers for polyolefins.

In accordance with the instant invention, it has been determined that nickel organophosphites significantly reduce the rate of increase in melt index of olefin polymers and particularly polypropylene under exposure to light, contribute little, if any, color, in contrast to previously used nickel compounds, and also improve retention of color and other important properties of the polymer. The invention accordingly provides nickel organophosphites and stabilizer compositions for olefin polymers and particularly polypropylene containing the same, which improve the resistance to light-induced deterioration of such polymers, and in combination with other olefin polymer heat and/or light stabilizers improve resistance to light and to both heat and light-induced deterioration for long periods of time, as evidenced by observation of melt index or mechanical properties after exposure to light.

Purity of propylene polymers, extent of degradation, and resistance to embrittlement over long periods of time are characteristics capable of evaluation by observation of the change in melt index of the particular polymer. There is a direct correlation between the rate of increase in melt index and the rate of deterioration in the above-mentioned physical properties of the polymer.

The nickel organophosphites in accordance with the invention are nickel salts of organophosphites wherein the nickel has a valence of two, at least one organic radical is linked to phosphorus through oxygen, and at least one of the oxygen atoms of the phosphite is ionically linked to nickel. These phosphites can include two phosphite radicals per nickel atom, or can have two oxygens of one phosphite group linked to one nickel atom. Any organic radical can be linked through oxygen to the phosphorus.

Thus, the nickel organophosphites of the invention can be defined by the following formula:

(1) 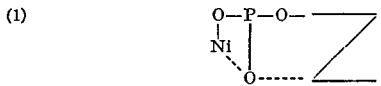

One of the oxygens of the phosphite group is linked to nickel, and one of the oxygens of the phosphite group is linked to the organic radical Z, the other oxygen being linked either to nickel or to an organic radical, as indicated by the dashed lines.

Z can be monovalent, or polyvalent, including bivalent and higher, in which latter cases polymers can exist also.

It will be evident that in the case where there are two phosphite groups linked to one nickel, the nickel organophosphite is a nickel bis(mono- or diphosphite) and the formula will take the form:

(2) 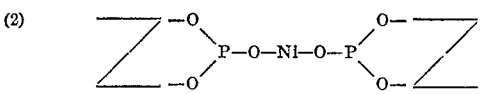

in which each valence of the nickel is linked to a phosphite group. In the bis(monophosphites) the Z is two radicals, and one such radical of each phosphite group is hydrogen. In the bis(di-phosphites) the hydrogens are absent, and both Z radicals are organic radicals.

In the case where two valences of nickel are linked to oxygens of the phosphite group, the compound is a nickel monophosphite and the formula takes the form:

(3) 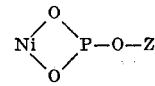

The nickel bis(monophosphites) of (2) and the nickel monophosphites (3) are believed to be new compounds.

In the formulae, Z represents hydrogen or an aliphatic, aromatic, nonaromatic alicyclic, or heterocyclic radical, whose molecular size is not critical, but which preferably has from about one to about thirty carbon atoms. In the case of Formula (2) above Z may be two monovalent radicals attached one to each oxygen, in which case one of the radicals can be a hydrogen atom, or Z may be a single bivalent radical. In the case were Z is attached to only one oxygen atom, the organic radicals are monovalent, or, if bivalent, are attached to the same or to another phosphite group, in which latter case the formula takes the form:

(4) 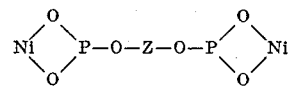

Polymers are also contemplated, in the case where Z is a bivalent or a higher polyvalent radical. Polymeric species are too numerous and too varied to be susceptible of illustration by a simple formula, but the following will show some types wherein Z is bivalent:

(5) 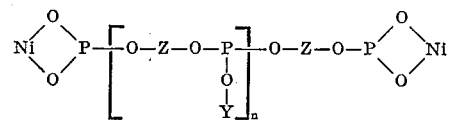

(6) 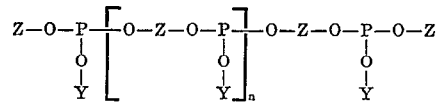

Y is another Z group or a nickel organophosphite group, and $n$ is the number of bracketed units, and can range from 1 to about 20.

The Z radicals preferably are hydrocarbon radicals, but they can in many cases include one or more of the same or different inert substituents, such as hydroxy, including phenolic hydroxyl; halogen such as chlorine, fluorine or bromine; nitro; and oxy or thio ether groups.

A preferred Z radical is a phenolic radical, and especially a bis-phenolic radical derived from a bis-phenol, of the type:

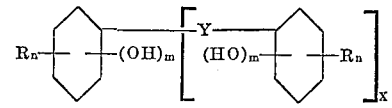

where R is an akyl or alkaryl group having from one to about thirty carbon atoms, $m$ is an integer representing the number of OH groups, and $n$ is an integer representing the number of R radicals, and $m$ is within the range from one to four, and $n$ is within the range from zero to five. $n$ preferably is one or two, and $m$ preferably is one or two. $x$ is an integer representing the number of

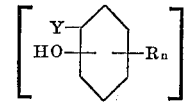

radicals, and is within the range from zero to about four, and Y is a bivalent linking group, where Y is an oxygen or sulfur atom, or an alkylene or alicyclidene or arylene or a mixed alkylene-alicyclidene or alkylene-arylidene group, having a straight or branched chain, whose total number of carbon atoms, ranges from one to about eighteen.

Typical Y groups are —CH$_2$—, —CH$_2$CH$_2$—,

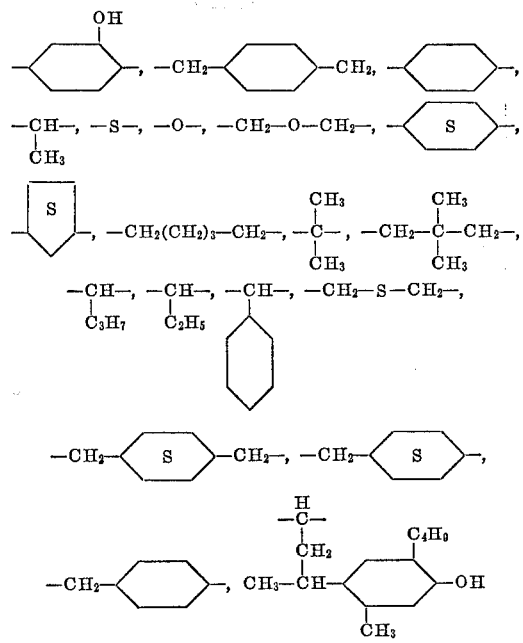

and

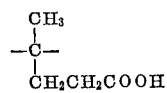
CH$_2$CH$_2$COOH

Nickel phosphites including a phenolic radical have heat-stabilizing effectiveness as well as light-stabilizing effectiveness.

The total number of carbon atoms of the Z groups is from one to about thirty carbon atoms.

As typical monovalent Z and R radicals, there can be mentioned methyl, ethyl, propyl, isopropyl, sec-butyl, tert-butyl, isobutyl, amyl, isoamyl, hexyl, isohexyl, octyl, iso-octyl, 2-ethyl hexyl, nonyl, lauryl, myristyl, octadecyl, behenyl, palmityl, oleyl, linoleyl, ricinoleyl, ethoxyethyl, ethoxymethyl, mercaptopropyl, phenoxyphenyl, hydroxyethyl, glyceryl, butoxyethoxyethyl, chloroethyl, bromopropyl, hydroxybutyl, phenyl, p-xylyl, tolyl, α-naphthyl, β-naphthyl, benzyl, α-phenethyl, β-phenethyl, p-(1-(4-hydroxyphenyl) butyl phenyl, p-(4-hydroxyphenyl thio)-phenyl, p-(1-(4-hydroxyphenyl) cyclohexyl) phenyl, 4-bromobenzyl, hydroxyphenyl, 3-bromophenyl, 2-chlorophenyl, 2,4-dichlorophenyl, 2,4-dihydroxyphenyl, p-cresyl, m-methoxyphenyl, p-nitrophenyl, cyclohexyl, cyclopentyl, tetrahydrofurfuryl, cycloheptyl; p-(1-(2-hydroxy-4-tert-butyl phenyl) butylidene) phenyl, p-(1(2-hydroxy-4-methyl phenyl) cyclohexylidene) phenyl; p-(1-(2-hydroxy phenyl)methylene phenyl); 1,4-p-(1-(2-hydroxy-4-isopropyl phenyl)phenylene-4-isopropyl phenyl); 2,2-p-(1-(2-hydroxy-5,6-di-methyl phenyl) ethylene 5, 6-dimethyl phenyl).

Typical bivalent Z radicals include ethylene, 1,4-tetramethylene, 1,3-trimethylene, 1,1-dimethyl ethylene-1,2; 2,2'-biphenylene, 1,8-naphthalene, 1,4-diphenylene, 1,4-cyclohexylene, 1,2-propylene, 1,3-cyclopentylene, 1,3-butylene, 1,5-amylene, 1,3-phenylene, and phenylethylene.

Exemplary nickel phosphites are nickel monoisooctyl phosphite, nickel bis(phenyl phosphite), nickel monophenyl mono-2-ethylhexyl phosphite, nickel bis(di-tolyl phosphite), nickel bis(isooctyl phosphite), nickel mono- isooctyl monotolyl phosphite, nickel bis(di-cyclohexyl phosphite), nickel monophenyl monocyclohexyl phosphite, nickel bis(diethylphenyl phosphite), nickel bis(cresyl phosphite), nickel bis(dimethylphenyl phosphite), nickel monocresyl monodimethyl phenyl phosphite, nickel octadecyl phosphite, nickel dodecyl phosphite, nickel monodiphenyl monophenyl phosphite, nickel mon-t-octylphenyl phosphite, nickel mono-t-nonyl phenyl phosphite, nickel monobenzyl phosphite, nickel monobenzyl mono-isopropyl phosphite, nickel mono-α-naphthyl phosphite, nickel bis-(di-α-naphthyl phosphite), ethylene di(nickel phosphite), nickel di(propylene phosphite), ethylene oxyethylene di(nickel phosphite), and 1,4-phenylene di(nickel phosphite), nickel bis-(2-ethyl hexyl phosphite), nickel bis-(di(2-ethylhexyl) phosphite), nickel mono-(2-ethylhexyl phosphite), nickel monophenyl phosphite, nickel bis(monophenyl mono-2-ethylhexyl phosphite), nickel monotolyl phosphite, nickel bis(monoiso-octyl monotolyl phosphite), nickel monocyclohexyl phosphite, nickel bis(monophenyl monocyclohexyl phosphite), nickel monodiethylphenyl phosphite, nickel monocresyl phosphite, nickel monodimethylphenyl phosphite, nickel bis(monocresyl monodimethyl phenyl phosphite), nickel bis-(dioctadecyl phosphite), nickel bis-(dodecyl phosphite), nickel bis-(diphenyl phenyl) phosphite, nickel bis-(di-t-octylphenyl phosphite), nickel bis-(t-nonyl phenyl phosphite), nickel bis-(benzyl phosphite), nickel bis-(monobenzyl monoisopropyl phosphite), nickel bis-(α-naphthyl phosphite), nickel mono-β-naphthyl phosphite, nickel bis-(dibenzyl phosphite), nickel bis(ethylene phosphite), nickel bis(neopentylene phosphite), nickel bis(ethylene oxyethylene phosphite) and nickel bis(1,4-phenylene phosphite)

The following nickel compounds are more clearly represented by formula than by name:

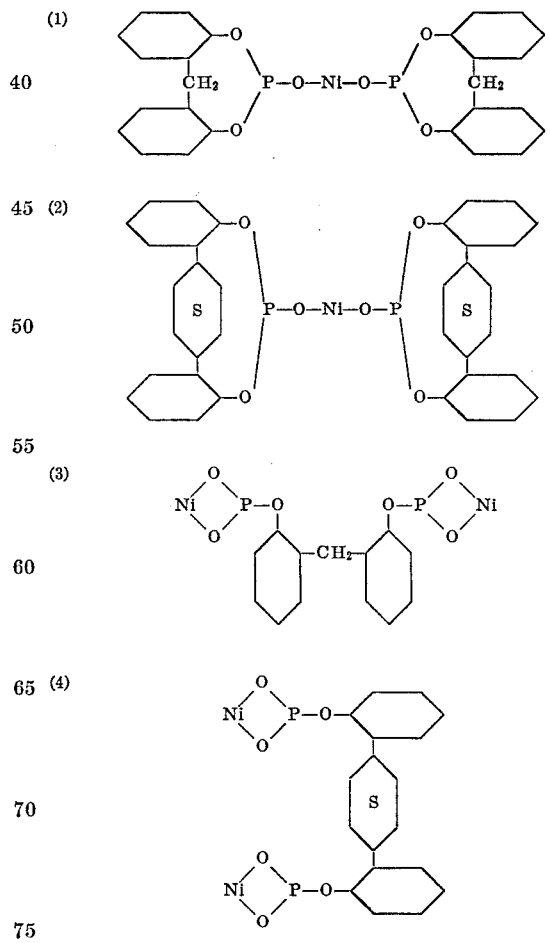

(5) 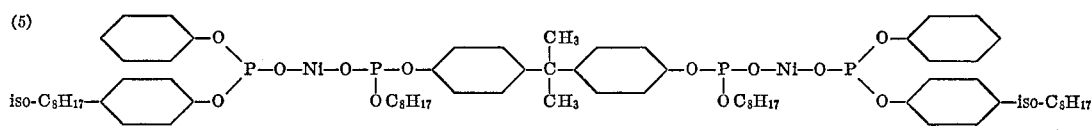

(6) 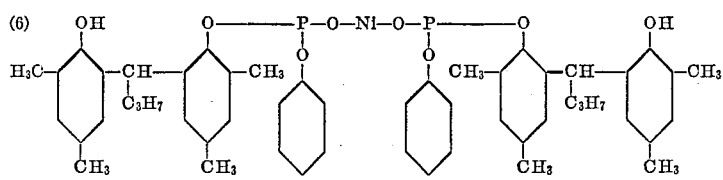

(7) 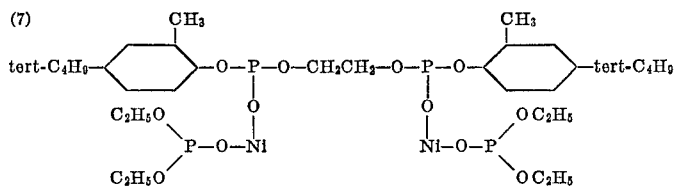

(8) 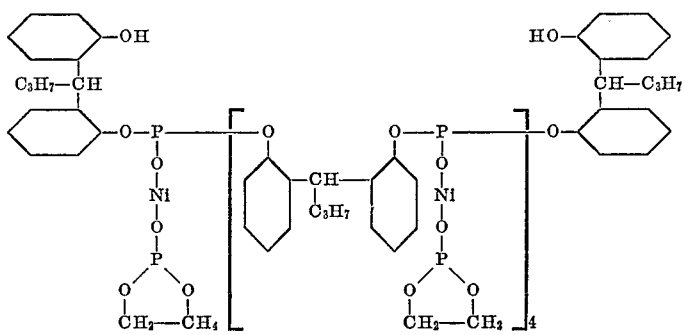

(9) 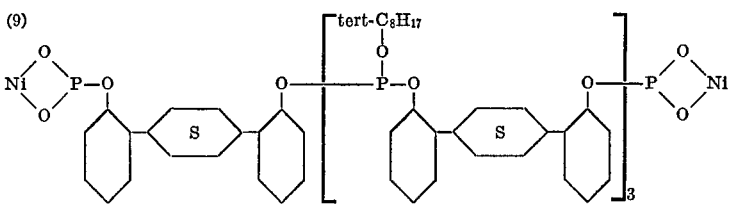

(10) 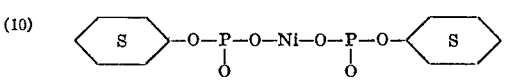

(11) 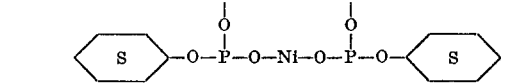

(12) 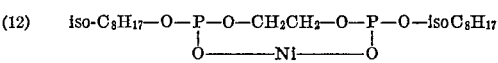

(13) 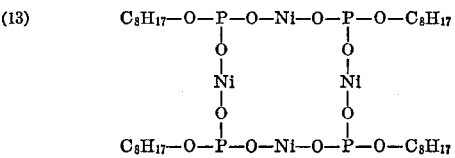

All of these nickel organophosphites are effective light stabilizers for polyolefin resins, in which environment they do not interfere with heat stabilizers, and do not impart strong colors. However, the nickel monophosphites and bis-(monophosphites) are preferred, because, unlike the bis-(diphosphites), they are resistant to hydrolysis by moisture. In fact, in preparatory procedures involving hydrolysis with water, the monophosphites are formed preferentially, and are stable, while the bis-(diphosphites) also can be converted to the monophosphites by hydrolysis with water. Therefore, if a bis-(diphosphite) is desired, the reaction system must be kept as dry as possible.

The nickel monophosphite and diphosphite compounds are usually prepared by reaction of the corresponding

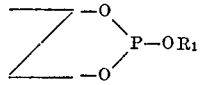

compound, where $R_1$ is hydrogen or an organic radical that is lost in the reaction, such as an aliphatic, cycloaliphatic, or mixed aliphatic aromatic or aliphatic cycloaliphatic group, and Z is as defined above, monofunctional (monovalent Z radicals) or polyfunctional (bivalent and higher polyvalent Z radicals), with a nickel compound, such as the oxide, hydroxide, or a salt (optionally, when a nickel salt is used, in the presence of an alkaline compound to take up the salt anion, such as sodium hydroxide), in proportions stoichiometrically calculated to give the desired proportion of such radicals in the final molecule. Mixtures of the various possible species usually are obtained, and the possibilities are much multiplied in the case of polyfunctional alcohols and phenols. The reaction proceeds quickly and quantitatively under reflux, desirably in solution in water or in an inert solvent such as benzene, toluene, cyclohexane or petroleum ether. In the presence of water, the monophosphite is obtained; in an anhydrous medium, the diphosphite is obtained. For a quantitative reaction when a triphosphite is used, the by-product of the transesterification (phenol from triphenyl phosphite, for example) is removed by distillation as the reaction proceeds.

Typical varieties possible from the transesterification of propylene glycol-1,3, nickel hydroxide, and triphenyl phosphite are:

(1) 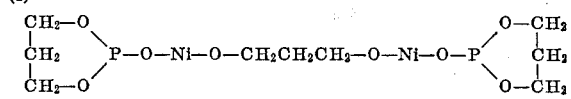

(2) 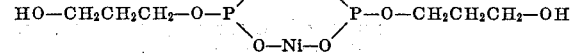

(3) 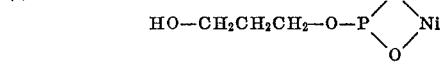

(4) 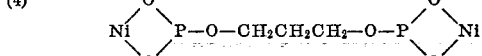

(5) 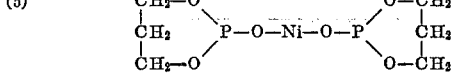

(6) 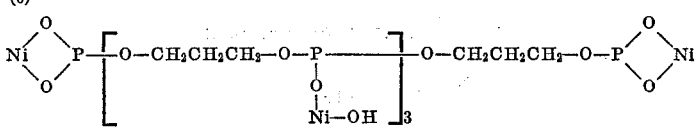

(7) 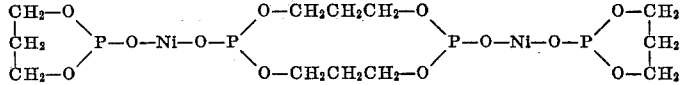

With trifunctional hydroxy compounds, even more permutations are possible.

The following examples illustrate preferred embodiments of the procedure for preparing the nickel organophosphites of the invention.

Examples A to I

A number of nickel monophosphites and bis-(monophosphites) were prepared using the following procedure, taking nickel bis-(monoisooctyl phosphite) as exemplary.

Di-iso-octyl phosphite 91.8 g. (0.3 mole) in a 3-neck flask was treated with 12 g. sodium hydroxide (0.3 mole) dissolved in 100 ml. water by dropwise addition with stirring during seventy-five minutes. An exothermic reaction brought the mixture to 74° C. by the end of the addition of the sodium hydroxide solution.

At this point, heating was begun, and a solution of nickel dichloride (25 g. of the hexahydrate in 150 ml. water, 0.105 mole) was added during fifteen minutes, with stirring and heating continued for one hour. The temperature had reached 91° C. after the addition of the nickel chloride solution and 87° C. after the heating period.

The reaction mixture was then taken up in 200 ml. benzene, washed with four portions of hot water to remove soluble salts, and evaporated under vacuum to 85° C. pot temperature.

The resulting product was a viscous, hazy, green liquid, and analyzed 7.93% nickel (by titration with ethylene diamine tetracetic acid). Addition of 11.26 g. mineral spirits (aliphatic hydrocarbon solvent mixture) to 35 g. of the above product gave a clear, mobile solution containing 6% nickel.

A portion of the viscous liquid product was diluted with two volumes of acetone. A light green solid precipitated. After drying, this analyzed 13.3% nickel and 12.7% phosphorus. The salt

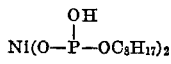

requires nickel 13.2% and phosphorus 13.9%.

Using the same procedure, the following nickel monophosphites and bis(monophosphites) were prepared:

| | Amount of Reactants | | | Reaction Product |
|---|---|---|---|---|
| | NiCl$_2$·6H$_2$O, g. | NaOH, g. | Acid Phosphite, g. | |
| Example: | | | | |
| B | 47.6 | 12.6 | Dibutyl phosphite, 77 | OH<br>Ni—(O—P—O—C$_4$H$_9$)$_2$<br>Crystals from water, 16.3% Ni. (Requires 17.6% Ni.) |
| C | 7.5 | 2.2 | Di-(mixed nonylphenyl and dinonyl phenyl)phosphite, 23.5. | OH<br>O—P—O—⟨⟩—C$_9$H$_{19}$<br>Ni<br>O—P—O—⟨⟩—(C$_9$H$_{19}$)$_2$<br>OH<br>Green, Solid. 7.8% Ni. |
| D | 11.9 | 4.0 | Di-isodecyl phosphite, 36.2 | OH<br>Ni—(O—P—O—C$_{10}$H$_{21}$—iso)$_2$<br>Product was solution in isodecyl alcohol. |

|   | Amount of Reactants | | | Reaction Product |
|---|---|---|---|---|
|   | $NiCl_2 \cdot 6H_2O$, g. | NaOH, g. | Acid Phosphite |   |
| E | 11.9 | 4.0 | Di-isotridecyl phosphite, 44.6 | $Ni—(O—\overset{OH}{\underset{\|}{P}}—O—C_{13}H_{27}—iso)_2$ Product was solution in iso-tridecyl alcohol. Ni 5.4%; Calculated Ni 5.7%. |
| F | 23.8* | 4.0 | Mono-isodecyl phosphite, 22.2 | $Ni—(O—\overset{OH}{\underset{\|}{P}}—O—iso—C_{10}H_{21})_2$ Product was light green solid. 12.35% Ni; Calculated 11.9%. |
| G | 23.8* | 4.0 | Mono-isotridecyl phosphite, 26.1 | $Ni—(O—\overset{OH}{\underset{\|}{P}}—O—iso—C_{13}H_{27})_2$ Light green solid. M.P. 133–38° C. 10.85% Ni; Calculated 10.2%. |

*These two preparations had 100% excess of $NiCl_2$ or only 50% of NaOH necessary to react all the $NiCl_2$.

The following nickel monophosphites also were prepared:

|   | Amount of Reactants | | | Reaction Product |
|---|---|---|---|---|
|   | $NiC_2 \cdot 6H_2O$, g. | NaOH, g. | Acid Phosphite, g. |   |
| Example: |   |   |   |   |
| H | 23.8 | 8.0 | Mono-isodecyl phosphite 22.2 | 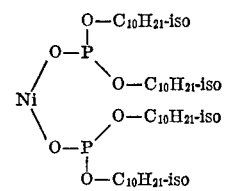 Pale green solid. 17.0% Ni; Calculated 21.1%. |
| I | 23.8 | 8.0 | Mono-isotridecyl phosphite 26.4 | 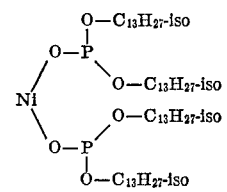 Pale green solid. 17.2% Ni; Calculated 18.0%. |

Examples J and K

Several nickel bis(dialkyl phosphites) were prepared by the following procedure. As the reaction of dialkyl phosphite with aqueous solutions of nickel chloride and base gives the nickel compounds of monoalkyl phosphites, the salts of the dialkyl phosphites were made in an anhydrous medium.

Di-isodecyl phosphite (72.9 g., 0.2 mole) in benzene (300 ml.) was converted to the sodium salt by addition of metallic sodium (4.6 g., 0.2 gram-atom) in small pieces with stirring. After the metal had been added, the mixture was heated to 75° C. and stirred overnight without further heating to complete the formation of the salt.

Nickel chloride hexahydrate (23.8 g., 0.1 mole) and 150 ml. 2-ethoxyethanol were stirred together and heated to distil out the water of hydration along with some 2-ethoxyethanol. After some distillate had been collected, 50 ml. fresh 2-ethoxyethanol were added to the nickel chloride solution, and the distillation continued. By repeating this procedure, a total of 150 ml. distillate was collected.

The above solutions of dried nickel chloride and sodium di-isodecyl phosphite were mixed and evaporated to about one-quarter the original volume. Acetone was added to the resulting yellowish viscous liquid to precipitate golden-yellow plate-like crystals of the nickel compound, 9.0% nickel, calculated 7.5%:

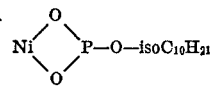

The same procedure was also carried out with di-isotridecyl phosphite, giving a product of similar appearance, 7.8% nickel, calculated 6.2%:

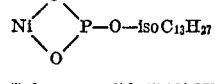

Examples L and M

Using the procedure of Examples A to I, the following nickel monophosphite and bis-(monophosphite) were prepared:

| Example | Amount of Reactants | | | Reaction Product |
|---|---|---|---|---|
| | NiCl₂·6H₂O, g. | NaOH, g. | Phosphite | |
| L | 11.9 | 4.0 | Transesterified product from 16.8 g. t-butyl hydroquinone, 23.4 diphenyl phosphite, at 110° C. for 3 hours, phenol stripped at 15 mm. pressure. | 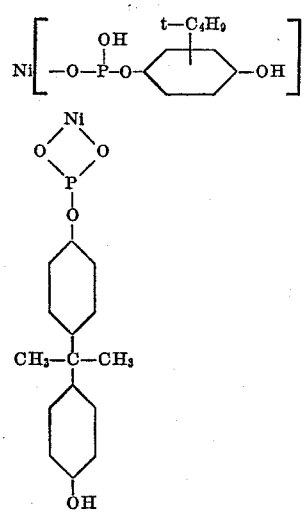 |
| M | 119.5 | 40.0 | Transesterified product from 118 g. Bisphenol A and 155 g. triphenyl phosphite, at 120° C. for 2 hours, in presence of 0.5 g. Na metal, no stripping. | |

Examples N and O

Using the procedure of Examples J and K, the following nickel bis-(diphosphites) were prepared:

| Example | Amount of Reactants | | | Reaction Product |
|---|---|---|---|---|
| | NiCl₂·6H₂O, g. | Na, g.[1] | Acid Phosphite | |
| N | 11.9 | 6.9 | Transesterified product of 33.6 g. t-butyl hydroquinone and 23.4 g. diphenyl phosphite at 110° C. for 2 hours, phenol stripped at 15 mm. | 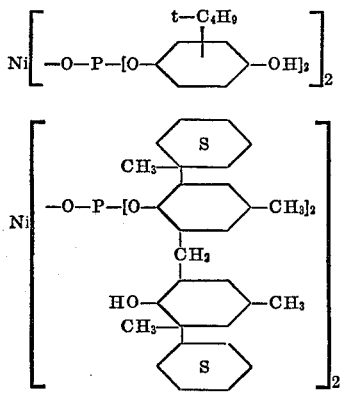 |
| O | 2.38 | 1.38 | Transesterified product from 16.8 g. of 2,2'-methylenebis (4-methyl-6,1(1'-methylcyclohexyl)phenol) and 5.4 g. diphenyl phosphite at 110° C. for 2 hours, phenol stripped at 15 mm. | |

[1] Sufficient to form the sodium salt of the acid phosphite and of the free phenolic hydroxyls of the phenol.

The nickel organophosphites of the invention are effective light stabilizers when used with olefin polymers, and especially propylene polymers, as the sole stabilizer. They are characterized by a very low color contribution, and their effectiveness is particularly evidenced by an improved resistance of the resin to an increase in melt index upon exposure to sunlight for long periods of time. They can also be used in conjunction with other olefin and propylene polymer light and heat stabilizers, wherein they are effective in supplementing the stabilizing effect contributed by the other stabilizers without disadvantageously affecting the desired properties of the polymer. In many cases, an enhanced or synergistic effect is observed.

Among the additional light stabilizers that can be used in conjunction with the nickel organophosphites of the invention are the 2-hydroxy benzophenones or derivatives thereof, which include a nucleus of the structure:

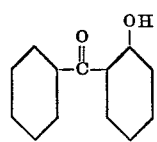

This nucleus is inclusive of the compound 2-hydroxy benzophenone, and derivatives thereof bearing substituent groups attached to any of the ring carbon atoms of the nucleus.

The preferred benzophenones of this invention, containing a nucleus of the above structure, have the following formula:

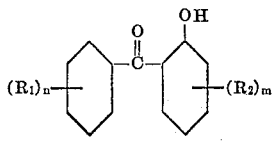

wherein $n$ is an integer from 0 to 5 and $m$ is an integer from 0 to 4 and the R radicals are selected from the group consisting of hydroxyl, halogen (such as fluorine, chlorine, bromine and iodine, and preferably chlorine or bromine) and organic radicals selected from the group consisting of aliphatic, alicyclic, and heterocyclic groups of from one to thirty carbon atoms. However, there is no upper limit, other than impracticability, on the number of R carbon atoms. Typical R-radicals are alkyl, alkenyl, alkynyl, cycloalkyl, acyl, aryl, alkaryl, aralkyl, alkoxy, aryloxy, alkaryloxy, aralkoxy, oxyalkylene, hydroxyalkyl, and hydroxyalkylene radicals, and esters thereof with organic carboxylic acids. These radicals may, if desired, contain inert, nonreactive substituents such as halogen and other carbocyclic and heterocyclic ring structures and up to a total of three R-radicals are hydroxyl.

Within the above limitations, the R-radicals substituted on any ring or on different rings can be the same or different.

Typical organic radicals are, for example, methyl, ethyl, propyl, isopropyl, butyl, isobutyl, t-butyl, amyl, isoamyl, n-octyl, isooctyl, 2-ethylhexyl, t-octyl, decyl, tert-nonyl, tert-heptyl, undecyl, dodecyl, pentadecyl, octadecyl, tricosyl, and nonacosyl; allyl, hexenyl, linoleyl, ricinoleyl, oleyl, undecadienyl, 12-octadecenyl, propynyl, methoxy, n-butyoxy, n-octyloxy, 2-ethylhexyloxy, n-decyloxy, benzyloxy, acetoxy, benzyloxy; hexynyl, undecynyl; monochloroethyl, dichloroethyl, monobromopropyl, tribromopropyl, fluoroheptyl, chlorododecyl, chlorododecenyl, chlrododecynyl, chlorotricosyl; hydroxychlorononyl, hydroxybromodecyl, hydroxybromotricosyl; hydroxyethyl, hydroxypropyl, monohydroxyundecyl, dihydroxyundecyl, hydroxyundecenyl, hydroxyundecynyl, glyceryl, sorbityl, pentaerthrityl, and polyoxyalkylene radicals such as those derived from diethylene glycol, triethylene glycol, polyoxyethylene glycol, polyoxypropylene glycol, and polyoxypropyleneoxyethylene glycol, and esters thereof with any of the organic aliphatic, alicyclic, or oxygen-containing heterocyclic acids. By the term "aliphatic acid" is meant any open chain carboxylic acid substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. Exemplary of such acids are acetic, propionic, butyric, valeric, hexanoic, ethyl-heptanoic, n-octanoic, isooctanoic, capric, undecanoic, lauric, myristic, palmitic, stearic, oleic, ricinoleic, behenic; chlorocaproic and hydroxycapric acids.

As typical examples of benzophenones that are intended to be included within the scope of this invention may be mentioned the following:

2-hydroxy benzophenone,
2-hydroxy-4-bromobenzophenone,
2-hydroxy-4-methyl-benzophenone,
2,4-dihydroxy-4'-tertiary-butyl-benzophenone,
2,4,4'-trihydroxy-benzophenone,
2-hydroxy-4-methoxy-4'-tertiary-butyl-benzophenone,
2-hydroxy-4-decyloxy-benzophenone,
2-hydroxy-4-heptyloxy-3',4'-dimethyl-benzophenone,
2,2'-dihydroxy-4-(2-ethylhexyloxy) benzophenone,
2-hydroxy-4-benzyloxy-4'-tertiary-butyl-benzophenone,
2-hydroxy-4,4'-dimyristoyloxy-benzophenone,
2-hydroxy-4-(o-chlorobenzoyloxy) benzophenone,
2-hydroxy-4-iodo-benzophenone,
2-hydroxy-4-(pentachloro-benzyloxy)-benzophenone,
2-hydroxy-4-benzyloxybenzophenone,
2-hydroxy-4,5-dimethyl-benzophenone,
2-hydroxy-4-benzyloxy-5-chlorobenzophenone,
2-hydroxy-5-hexyl-2',4'-dimethylbenzophenone,
2 - hydroxy - 4-(3,4-dichlorobenzyloxy)-4'-t-butylbenzophenone,
2-hydroxy-3-methyl-4'-nitrobenzophenone,
2-hydroxy-4-hexyl-benzophenone,
2-hydroxy-4-benzyloxy-2',4',5'-trichlorobenzophenone,
2-hydroxy-4-ethyl-3'-chlorobenzophenone,
2,4-dihydroxy-benzophenone,
2,2',4-trihydroxybenzophenone and 4-n-decycloxy-2,2'-dihydroxybenzophenone.

Also useful are the 2,4,6-derivatives of 1,3,5-trithiane containing hydroxyl groups having a phenolic character:

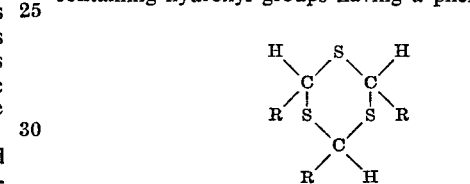

R may represent, for example:

(1) HO—⬡— 
4-hydroxy-phenyl (2) ⬡—
    |
    OH
2-hydroxy-phenyl (3) Cl—⬡—
       |
    OH Cl with Cl substituent
2,4,6-trichloro-3-hxdroxy-phenyl (4) HO—⬡—
        |
        OCH₃
4-hydroxy-3-methoxyphenyl (5) HO—⬡—
        |
        OC₂H₅
4-hydroxy-3-ethoxyphenyl (6) CH₃
     |
    ⬡—
     |
     OH
6-hydroxy-3-methyl-phenyl (7) OH
     |
    ⬡—
     |
     Cl
2-hydroxy-5-chlorophenyl The o-hydroxyphenylbenzotriazoles also can be used. These have the formula:

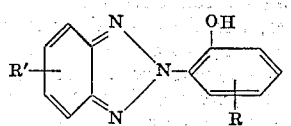

wherein R and R' are selected from the group consisting of hydrogen, hydrocarbon and oxyhydrocarbon radicals.

In the formula, the permissible R and R' substituents are numerous and varied. R and R', as stated, may each be hydrogen, in which case the compound is o-hydroxyphenylbenzotriazole, or each may be a hydrocarbon or oxyhydrocarbon radical. Typical hydrocarbon radicals that the R and R' substituents can comprise are alkyl, aryl, cycloalkyl, aralkyl and alkaryl radicals such as methyl, ethyl, propyl, n-butyl, decyl, octadecyl, phenyl, cyclohexyl, benzyl, tolyl and similar radicals. Typical oxyhydrocarbon radicals are methoxy, ethoxy, propoxy, isopropoxy and the like.

Exemplary are: 2-(2-hydroxy-5-methylphenyl) benzotriazole, 5,6-dichloro-2-(2-hydroxy-5-tertiary-butylphenyl) benzotriazole, 5-methyl-2-(2-hydroxy-3',5'-dichlorophenyl) benzotriazole.

The 1-dioxides of α,β-benzoisothiazolone or saccharine can be used also:

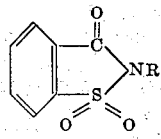

where R is hydrogen or an alkyl, aryl or alkylaryl group of from one to twelve carbon atoms, such as 2-methyl saccharine, 2-ethyl saccharine, 2-dodecyl saccharine, and 2-phenyl saccharine.

The alkyl styryl ketones also are satisfactory. These have the formula:

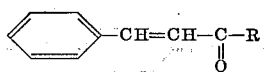

where R is an alkyl or aryl radical having from one to eight carbon atoms, such as benzalacetone, ethyl styryl ketone, and 2,4-dihydroxyphenyl styryl ketone.

The 2-hydroxy aryl-1,3,5-triazines are useful. These have the formula:

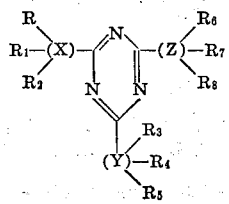

in which X, Y and Z are each an aromatic radical each containing up to three nuclei of six carbon atoms, for example, phenyl, naphthyl or biphenyl, X being substituted by a hydroxy group ortho with respect to the point of attachment to the triazine nucleus. The R's are hydrogen, hydroxyl (preferably in the 2-, 4- and/or 5-position of the aromatic nucleus) alkyl (for example, methyl, tertiary-butyl, cyclohexyl, tertiary-octyl, n-octyl and dodecyl), alkoxy (for example, methoxy, n-butoxy, 2-ethylhexyloxy or n-octyloxy), sulfonic or carboxylic acid groups, halogen (for example, iodine, chlorine or bromine), haloalkyl (for example, dichloromethyl or trifluoromethyl) alkylamido (for example, acetamido), mono cyclic arylamide (for example, benzamide and lower monocyclic aryl lower alkyl amides, such as phenylacetamido). Exemplary are 2,4,6-tris-(2-hydroxy-4-octyl-oxyphenyl)-triazine-s;
2,4,6-tris-(2,4-dihydroxyphenyl)-triazine-s;
2,4,6-tris-(2-hydroxy-4-propoxyphenyl)-triazine-s;
2,4,6-tris-(2-hydroxy-5-methylphenyl)-triazine-s;
2,4-bis-(-2,4-dihydroxyphenyl)-6-(o-hydroxyphenyl)-triazine-s;
2-(-2,4-dimethylphenyl)-4-(-2,4-dihydroxyphenyl)-6-(o-hydroxyphenyl)-triazine-s;
2,4,6-tris-(-2-hydroxynaphthyl-1)-triazine-s;
2,4,6-tris-(o-hydroxyphenyl)-triazine-s;
2,4-(-2-hydroxy-5-carboxyphenyl)-6-(o-hydroxyphenyl)-triazine-s;
2,4,6-tris-(-2-hydroxy-5-chloro)-triazine-s;
2,4,6-tris-(-2,4-dihydroxy-6-hexylphenyl)-triazine-s;
2-(-2-,4-dihydroxyphenyl)-4,6-diphenyl-triazine-s;
2-(o-hydroxyphenyl)-4,6-bis(4-methoxyphenyl)-triazine-s;
2,4,6-tris(2,4-dimethoxyphenyl)-triazine-s;
2,4-bis-(-2-hydroxy-4-methoxyphenyl)-6-(-2,4-dimethoxyphenyl)-triazine-s;
2,4-bis-(-2,4-dihydroxyphenyl)-6-(-4-methoxyphenyl)-triazine-s.

The dialkylhydroxybenzoic acid derivatives are useful. These have the formula:

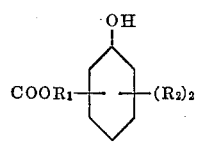

in which $R_1$ is hydrogen or an aryl, alkyl or alkaryl radical having from one to eighteen carbon atoms, and each $R_2$ is an alkyl radical, and at least one $R_2$ radical has a branched chain at an α-carbon atom, as for example, in the secondary or tertiary alkyl radical. Preferably, each R has from three to eight carbon atoms. Exemplary are 3-methyl-5-isopropyl-4-hydroxybenzoic acid, 3-ethyl-5-tertiarybutyl-4-hydroxybenzoic acid, 3-pentyl-5-tertiary-octyl-4-hydroxybenzoic acid, 3-pentyl-5-tertiary-octyl-4-hydroxybenzoic acid, 3,5-diisopropyl-4-hydroxybenzoic acid, 3-isopropyl-5-tertiary-butyl-4-hydroxybenzoic acid, 3,5-di-tertiary-butyl-4-hydroxybenzoic acid, 3-cyclohexyl-5-tertiary-butyl-4-hydroxybenzoic acid, 3,5-dicyclohexyl-5-tertiary-butyl-4-hydroxybenzoic acid, 3,5-dicyclopentyl-4-hydroxy benzoic acid, and 3,5-di-tertiary-octyl-4-hydroxybenzoic acid.

The most preferred compounds are those in which each R is a tertiary alkyl with at most eight carbon atoms, for example, 3,5-di-tertiary-butyl-4-hydroxybenzoic acid.

The triazines having the following formula can also be employed:

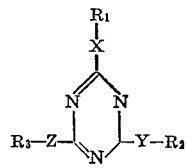

where $R_1$ and $R_2$ represent an alkyl group of from one to eighteen carbon atoms, for example, methyl, ethyl, propyl, butyl, pentyl, octyl, dodecyl and octadecyl, a cycloalkyl group of five to six carbon atoms, for example, cyclopentyl or cyclohexyl, a phenyl group or an alkyl phenyl group of from seven to twenty-four atoms, for example methylphenyl, ethylphenyl, butylphenyl, octylphenyl, octadecylphenyl, dimethylphenyl, dibutylphenyl and dioctadecylphenyl, an alkoxyalkyl group of from three to fifteen atoms, for example methoxymethyl, ethoxyethyl, butyoxyethyl, n-lauryl-oxyethyl, or an alkoxyphenyl group of from eight to nineteen carbon atoms, for example methoxyphenyl, ethoxyphenyl, n-octyloxyphenyl or n-lauryl-oxyphenyl. $R_3$ designates an alkyl hydroxyphenyl of from seven to twenty-four carbon atoms, for example, methylhydroxyphenyl, ethylhydroxyphenyl, butylhydroxyphenyl, octylhydroxyphenyl, octadecylhydroxyphenyl, di-t-butylhydroxyphenyl, methyl-di-t-butylhydroxyphenyl. X, Y and Z each designate a sulfur or oxygen atom or a substituted or unsubstituted imino group, preferably arylalkyl imino, for example, benzylimino.

An additional class of triazines has the formula:

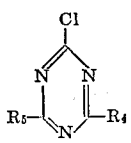

in which R₄ represents an alkylhydroxyanilino group, preferably one having seven to twenty-four carbon atoms, for example, methylhydroxyanilino, ethylhydroxyanilino, butylhydroxyanilino, octylhydroxyanilino, dodecylhydroxyanilino, octadecylhydroxyanilino, di - t - butyl - hydroxyanilino and methyl-di-t-butylhydroxy-anilino, or an alkyl thioalkoxy group, preferably having from one to eighteen carbon atoms, for example, thiomethyl, thioethyl, thiopropyl, thiobutyl, thiooctyl, thiododecyl and thiooctadecyl, and R₃ represents an alkylhydroxyaniline group, preferably one corresponding to the definition of R₁ and R₂.

Exemplary compounds coming withine one or both of the above triazine formulae are 6-(4-hydroxy-3,5-di-t-butylanilino) - 2,4 - bis - (n - thiooctyl) - 1,3,5 - triazine; 6-(4-hydroxy - 3,5-di-t-butylanilino) - 2,4-bis-thiophenyl-1,3,5-triazine; 6-(4-hydroxy-3,5-di-t-butylanilino)-2,4-bis-thiooctadecyl - 1,3,5-triazine; 6 - (4-hydroxy-3,5-di-t-butylanilino) - 2,4-bis-thio - cyclohexyl - 1,3,5-triazine; 6-(2-hydroxy - 3,5-di-t-butyl - 6-methylanilino)-2,4-bis-(n-thiooctyl) - 1,3,5-triazine; 6 - (4-hydroxy - 3,5-di-t-butylanilino) - 4-n-thiooctyl-2-chlor - 1,3,5-triazine; 4-6-bis - (4 - hydroxy-3,5-di-t-butyl-anilino) - 2 - chlor-1,3,5-triazine.

Additional stabilizers which can be used include: hydroxyethyl ethylene diamine triacetic acid, nitrolotriacetic acid, ethylene diamine tetraacetic acid, 2,4-dihydroxyphenyl furyl ketone, 2,2'-dihydroxy-4,4'-diethoxybenzil, 2-hydroxy benzaldehyde bis(n-dodecylmercaptal), tri-n-dodecyl-phosphoramide, tri-cyclohexyl - phosphoramide, hexamethyl - phosphoramide, octamethyl-pyrophosphor-amide, 2-cyano-3-p-dodecylanilino acrylonitrile, 2 - ethylhexyl(2-cyano-3-N-methylanilino)acrylate, oxalic acid, oxanilide, p-ethoxy - oxanilide, N,N' - diethyldithio-oxanide,N,N'-di-n-dodecyldithio - oxamide, N,N'-di-cyclohexyldithio-oxamide, N,N'-diamino-oxamidine salts (acetate, benzoate, phosphate), N,N'-dianilino oxamidine, 2-ethylhexyl(4-hydroxy-3,5 - ditertiary-butyl-α-cyano-cinnamate, n-butyl - (β-phenyl-α-cyano-cinnamate), 2-(4-hydroxy-3-methylphenyl) benzotriazole oxide.

Additional heat stabilizers which can be used include, for instance, phenols, organic triphosphites, thiodipropionic esters, polyvalent metal salts of organic acids, organic mercaptans, and organic polysulfides.

When the nickel organophosphite is used in conjunction with a phenol, the increased stabilizing effect is evidenced by improved resistance to yellowing, and an extended life, in terms of resistance to embrittlement and development of tackiness at elevated temperatures. A preferred class of nickel organophosphites contain free phenolic hydroxyl groups, and thus serve the function both of a phosphite and of a phenol. Such compounds are Nos. 6 and 8 above on page 14.

The phenol stabilizers whether a compound of the nickel compound molecule or separate compounds contain one or more phenolic hydroxyl groups, and can contain one or more phenolic nuclei. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups. Such phenols, which are preferred because of their superior stabilizing action, can be defined by the formula:

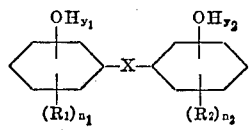

where X is an oxygen or sulfur atom, or an alkylene or alicyclidene or arylene or a mixed alkylene-alicyclidene or alkylene-arylidene group, having a straight or branched chain, whose total number of carbon atoms ranges from one to about eighteen, $y_1$ and $y_2$ are the number of phenolic hydroxyl groups OH, $n_1$ and $n_2$ are the number of R groups, and $R_1$ and $R_2$ are hydrogen or alkyl of one to about eighteen carbon atoms. Preferably, the OH groups are ortho and/or para to X.

The sum of $y$ and $n$ in each ring cannot, of course, exceed five.

Typical X groups are —CH₂, —CH₂CH₂—,

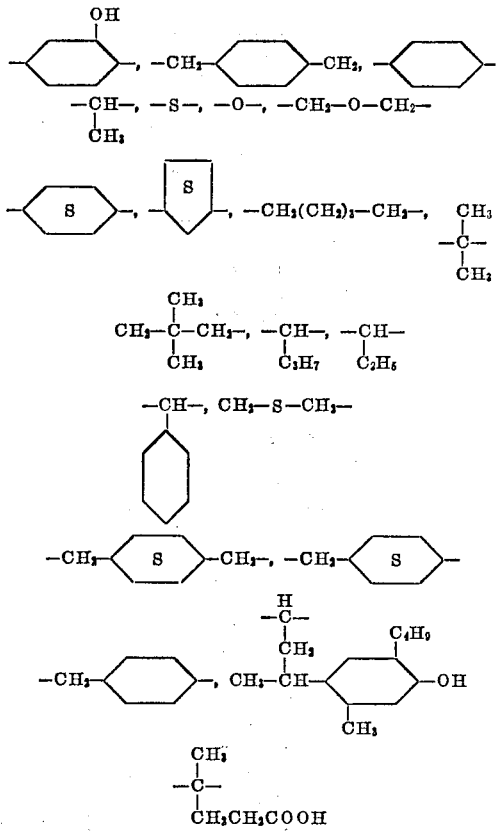

The various X and R groups are exemplified in the following compounds.

Exemplary of satisfactory monohydric phenols are 2,6-di-tertiary-butyl-4-methyl phenol, 2-tertiary-butyl-4-methoxy phenol, nonyl phenol, dodecyl phenol, dinonyl phenol, phenyl phenol, tetradecyl phenol, and tetrahydro-α-naphthol.

Exemplary polyhydric phenols are orcinol, propyl gallate, catechol, resorcinol, 4-octyl resorcinol, 4-dodecyl resorcinol, 4-octadecyl catechol, 4-isooctyl-phloroglucinol, pyrogallol, hexahydroxy benzene, 4-isohexyl-catechol, 2,6-ditertiary-butyl resorcinol, 2,6-diisopropyl-phloroglucinol, methylenebis-(2,6-ditertiarybutyl - m - cresol), methylenebis - (2,6 - ditertiarybutyl-phenol), 2,2 - bis(4-hydroxyphenyl) propane, methylenebis (p-cresol), 4,4'-thio-bis-phenol, 4,4'-oxobis-(3-methyl - 6 - isopropyl-phenol), 4,4' - thiobis(3-methyl-6-tertiary-butyl-phenol), 2,2' - oxobis(4-dodecyl-phenol), 2,2'-thiobis(4-methyl-6-tertiary-butyl-phenol), 2,6-diisooctyl resorcinol, 4,4'-n-butylidenebis(2-tertiarybutyl - 5 - methyl - phenol), 4,4'-benzylidenebis(2-tertiarybutyl-5-methyl - phenol), 2,2'-methylenebis - (4 - methyl-6-(1'-methyl - cyclohexyl)-phenol), 4,4'-cyclohexylidene-bis(2-tertiarybutyl-phenol), 2,6 - bis(2'-hydroxy-3'-tertiarybutyl-5'-methylbenzyl)-4-methyl-phenol, 4-octyl pyrogallol, and 3,5-ditertiarybutyl catechol.

When the nickel organophosphite is used with another organic phosphite, the phosphite can be any organic triphosphite having attached to phosphorus through oxygen or sulfur, groups selected from aryl, alkyl, cycloalkyl, aralkyl and alkaryl groups, in any combinations, such as, three monovalent groups, (RA)₃P; one monovalent group and one bivalent group, forming a heterocyclic ring with the phosphorus,

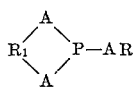

a plurality of bivalent groups forming polymers therewith,

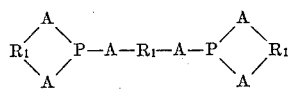

one trivalent group,

and a plurality of trivalent groups forming polymers therewith,

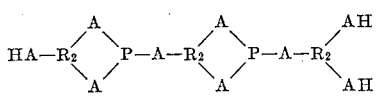

and any combinations of monovalent, bivalent and trivalent groups to form monomeric and polymeric phosphites; A is oxygen or sulfur. The term "organo phosphite triester," as used herein, is inclusive of oxo, thio and mixed oxo thio phosphites, as well as transesterified phenol-phosphite mixtures. Usually, the phosphite will not have more than about sixty carbon atoms.

Exemplary are monophenyl di-2-ethyl hexyl phosphite, diphenyl mono-2-ethyl hexyl phosphite, diisooctyl monotolyl phosphite, tri-2-ethyl hexyl phosphite, phenyl dicyclohexyl phosphite, diethyl phenyl phosphite, triphenyl phosphite, tricresyl phosphite, tri(dimethylphenyl) phosphite, trioctadecyl phosphite, triisooctyl phosphite, tridodecyl phosphite, isooctyl diphenyl phosphite, diisooctyl phenyl phosphite, tri(t-octylphenyl) phosphite, tri(t-nonylphenyl) phosphite, benzyl methyl isopropyl phosphite, butyl dicresyl phosphite, isooctyl di(octylphenyl) phosphite, di(2-ethylhexyl) (isooctylphenyl) phosphite, tri(2-cyclohexylphenyl) phosphite, tri-α-naphthyl phosphite, tri(phenylphenyl) phosphite, tri(2-phenyl ethyl) phosphite, tridodecyl thiophosphite, tri-p-tert-butyl phenyl thiophosphite, didecyl thiodiphenyl phosphite, tert-butyl phenyl thio-di-2-ethylhexyl phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butyloxy-1,3,2-dioxaphosphorinane, 2-octoxy - 5,5 - dimethyldioxaphosphorinane and 2-cyclohexyloxy-5,5-diethyldioxaphosphorinane.

When the nickel organophosphite stabilizers are used in conjunction with a thiodipropionic acid ester, the improvement is evidenced by a materially prolonged resistance to embrittlement and development of tackiness at elevated temperatures. The thiodipropionic acid ester has the following formula:

$$R_1OOCCH_2CH_2-S-CH_2CH_2COOY$$

in which $R_1$ is an organic radical selected from the group consisting of hydrocarbon radicals such as alkyl, alkenyl, aryl, cycloalkyl, mixed alkyl aryl, and mixed alkyl cycloalkyl radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of $n$ thiodipropionic acid ester units:

$$XO[OCCH_2CH_2SCH_2CH_2COOXO]_n$$
$$OCCH_2CH_2-S-CH_2CH_2COOZ$$

where Z is hydrogen, $R_2$ or M; $n$ is the number of thiodipropionic acid ester units in the chain; and X is a bivalent hydrocarbon group of the type of $R_1$; the value of $n$ can range upwards from 1, but there is no upper limit on $n$ except as is governed by the ratio of carbon atoms to sulfur atoms as stated below; and (d) a polyvalent metal M of Group II of the Periodic Table such as zinc, calcium, cadmium, barium, magnesium and strontium.

The molecular weights of the R and Y radicals are taken such that with the remainder of the molecule, the thiodipropionic ester has a total of from about ten to about sixty carbon atoms per sulfur atom.

Accordingly, the various thiodipropionic acid ester species coming within the above-mentioned categories within the general formula can be defined as follows:

(a) $R_1OOCCH_2CH_2SCH_2CH_2COOH$
(b) $R_1OOCCH_2CH_2SCH_2CH_2COOR_2$
(c) $R_1O[OCCH_2CH_2SCH_2CH_2COOX-O]_n$
       $OCCH_2CH_2SCH_2CH_2COOZ$
(d) $[R_1OOCCH_2CH_2SCH_2CH_2COO]_2M$

In the above formulae $R_1$ and $R_2$ M, X and Z are the same as before. In the polymer (c), as in the other forms of thiodipropionic acid esters, the total number of carbon atoms per sulfur atom is within the range from about ten to about sixty.

The R radical of these esters is important in furnishing compatibility with the polypropylene. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described below.

The aryl, alkyl, alkenyl and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, soribtyl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl- and aryl-substituted alkylene radicals such as 1,2-propylene,

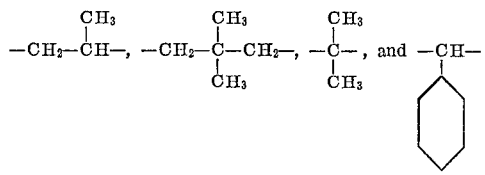

arylene radicals such as phenylene

methylenephenylene

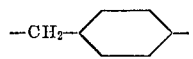

dimethylene phenylene,

and alicyclene radicals such as cyclohexylene

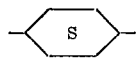

and cyclopentylene

As exemplary of the thiodipropionic acid esters which can be used, there can be mentioned the following: monolauryl thiodipropionic acid, dilauryl thiodipropionate, butyl stearyl thiodipropionate, di(2-ethylhexyl)-thiodipropionate, diisodecyl - thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl) thiodipropionic acid.

These esters are for the most part known compounds, but where they are not available, they are readily prepared by esterification of thiodipropionic acid and the corresponding alcohol.

When the nickel organophosphite is used in conjunction with a polyvalent metal salt of an organic acid, the polyvalent metal salt of an organic acid will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogeneous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with non-reactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or non-aromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petroleum, abietic acid, dihydroabetic acid, hexahydrobenzoic acid, and methyl furoic acid.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

The preferred stabilizer system of the invention comprises three, four or five stabilizers, the nickel organophosphite, a polyhydric phenol, as a free phenol or as a component radical on the nickel phosphite, and a thiodipropionic acid ester and optionally, a triphosphite and/or a 2-hydroxy-benzophenone. An additional sixth ingredient which is included in the preferred systems of the invention, but which is not essential, is a polyvalent metal salt of an organic acid. These stabilizers together give an enhanced stabilization which is not obtainable in the absence of the nickel organophosphite.

The nickel organophosphite, phenol, and thiodipropionic acid ester, taken together, not only prevent discoloration but also embrittlement and inhibit the increase in melt index, with accompanying degradation of physical properties, both upon exposure to light and at processing temperatures, and furthermore greatly enhance the resistance to discoloration and embrittlement on aging to far beyond that obtainable from the components individually. This enhanced stabilizing effect is obtained with any olefin polymer, regardless of the process by which it is prepared.

A very small amount of the nickel organophosphite is sufficient, with or without additional stabilizers, to improve the stability against deterioration in physical properties, including, for example, resistance to embrittlement, upon exposure to light under the conditions to which the olefin polymer will be subjected. An amount of the nickel organophosphite to supply an amount of nickel within the range from about 0.001 to about 0.5% by weight of the polymer imparts satisfactory light-resistance. Preferably, from 0.005 to 0.1% nickel is employed for optimum stabilization.

If additional stabilizers are employed to obtain additional stabilization effects, the total amount of such stabilizers is within the range from about 0.005 to about 5%, preferably from 0.1 to 3%.

Preferably, the stabilizer system comprises from about 0.005 to about 0.1% of nickel as nickel organophosphite, from about 0.025 to about 0.5% of a phenol, and from about 0.05 to about 1% of a thiodipropionic acid ester, with, optionally, from about 0.05 to about 2% of an organic triphosphite, when present, from about 0.025 to about 0.75% of a polyvalent metal salt, when present, and from about 0.05 to about 0.5% of another light stabilizer, such as a 2-hydroxy-benzophenone, when present.

If a combination of stabilizers is to be utilized, they may be formulated as a simple mixture for incorporation in the polymer by the polymer manufacturer or by the converter. An inert organic solvent can be used to facilitate handling, if the ingredients do not form a homogeneous mixture or solution.

Compatibility of phenol-phosphite combinations can be improved by heating the nickel organophosphite-phenol and any additional organic phosphite at an elevated temperature for a sufficient time to form a homogeneous solution. This solution is quite stable at ambient temperatures and even below. Temperatures of from 10° to 200° C. can be used, under reflux if necessary. A small amount, from 0.02 to 1%, of an alkali or alkaline earth metal, as such or in the form of a compound which forms a salt with the phenol, such as the metal, the oxide or hydroxide, such as sodium hydroxide, potassium hydroxide, calcium oxide and calcium hydroxide, or the phenolate such as sodium phenolate, should be present to expedite the reaction, which is believed to be a transesterification of organophosphite with the phenol, due to the fact that the alcohol or phenol that would be liberated by hydrolysis of the phosphite can be distilled out of the reaction mixture. The reaction will proceed without distillation of the hydrolysis reaction product from the mixture up to an equilibrium point, short of completion. Transesterification need not be complete; only a little, involving perhaps ⅓ of the organophosphite groups of a triphosphite and ½ of the phenol groups of a dihydric phenol on a mole-for-mole basis, is enough to make phosphite and phenol compatible, and stripping is unnecessary to effect a transesterification to this extent.

The stabilizer of the invention is applicable to olefin polymers prepared by any of the various procedures, using the available catalysts, such as the Ziegler, ICI, Union Carbide, Du Pont, Phillips, Montecatini, Esso and Standard Oil (Indiana) process polymers (Chem. and Eng. News, Nov. 21, 1960, pp. 36–59), for the molecular weight and tacticity are not factors affecting this stabilizer.

Olefin polymers prepared by these processes contain traces of catalyst residues. These residues materially diminish the stability of the olefin polymer, despite efforts to overcome the problems by addition of polyvinyl chloride resin stabilizers, whose function was to act on the halogen or halide of the catalyst in the same manner as on the halogen or liberated halide of the polyvinyl chloride resin. It is now customary to remove catalyst residues substantially completely, so that the addition of polyvinyl chloride resin stabilizers is no longer indicated. The stabilizers of the invention are effective, however, with any olefin polymers, whether containing or substantially free from catalyst residues.

Polypropylene solid polymer can be defined in a manner to differentiate it from other polyolefins as having a density within the range of from 0.86 to 0.91, and a melting point above 150° C. The stabilizer of the invention is applicable to all such polypropylenes as distinguished from polypropylenes in the liquid form or in semi-liquid or gel-like forms such as are used as greases and waxes.

Isotactic polypropylene, available commercially under the trade names Profax, Escon and Olefane and having a softening or hot-working temperature of about 350° F. is an example of a sterically regular polypropylene polymer.

Mixtures of olefin polymers, such as propylene polymers with other compatible olefin polymers, and copolymers of propylene with copolymerizable monomers such as ethylene and butene, also can be stabilized in accordance with this invention. For example, mixtures of polyethylene and polypropylene, and copolymers of propylene and ethylene which contain a sufficient amount of propylene to present the instability problem that is resolved by the stabilizer of the invention, can be stabilized by the addition of a nickel organophosphite, alone or in combination with other propylene polymer stabilizers.

The stabilizers of the invention can also be used with low density polyethylene, Ziegler polyethylene, high density polyethylene, poly(butene-1), poly(pentene-1), poly(3-methylbutene-1), poly(4-methylpentene-1), and polystyrene.

The stabilizer is incorporated in the polymer in suitable mixing equipment, such as a mill or a Banbury mixer. If the propylene polymer has a melt viscosity which is too high for the desired use, the propylene polymer can be worked until its melt viscosity has been reduced to the desired range before addition of the stabilizer. However, propylene polymers in a range of workable melt viscosities are now available. Mixing is continued until the mixture is substantially uniform. The resulting composition is then removed from the mixing equipment and brought to the size and shape desired, for marketing or use.

The stabilizing effectiveness of the nickel organophosphites of the invention was evaluated in the working examples which follow, using the melt index, ASTM D1238–57T, as a criterion.

Example 1

In accordance with this invention, the nickel organophosphites listed in the table which follows were weighed and dispersed by hand stirring in 100 parts of powdered previously unstabilized polypropylene (Profax 6501) together with 2-hydroxy-4-n-decyloxy benzophenone, dilauryl thiodipripionate, zinc 2-ethyl hexoate, and the product of the transesterification of one mole of triphenyl phosphite, 0.5 mole of 4,4'-n-butylidene-bis(2-tert-butyl-5-methyl-phenol), 2 moles of tridecyl alcohol, and 0.9 g. of sodium hydroxide; transesterified at 110 to 170° C. for three hours. This polymer as supplied had a melt index of 2.3 at 230° C. The mixture so prepared was in each case placed on a 2-roll mill and fluxed for five minutes at 170±2° C. 20 mil slabs were then molded from each test composition, and exposed to light and air at the Desert Sunshine Exposure Test Station at Phoenix, Arizona for the time period noted in Table I below, after which the melt index was again taken.

TABLE I

| Composition: | Control A | Control B | Control C | Control D | Control E | Example 1 |
|---|---|---|---|---|---|---|
| Profax 6501 | 100 | 100 | 100 | 100 | 100 | 100 |
| 2-hydroxy-4-decyloxy benzophenone | 0.25 | 0.25 | 0.25 | 0.25 | 0.25 | 0.25 |
| Dilauryl thiodipropionate | 0.25 | 0.25 | 0.25 | 0.25 | 0.25 | 0.25 |
| Zinc 2-ethyl-hexoate | 0.05 | 0.05 | 0.05 | 0.05 | 0.05 | 0.05 |
| Transesterification product supplying: | | | | | | |
| 4,4'-n-butylidene-bis-(2-tert-butyl-5-methyl-phenol) | 0.10 | 0.10 | 10.0 | 0.10 | 0.10 | 0.10 |
| Triphenyl phosphite | 0.10 | 0.10 | 0.10 | 0.10 | 0.10 | 0.10 |
| Nickel 2-ethyl hexoate, 6% Ni | | 0.25 | | | | |
| Nickel acetyl acetonate, 23.2% Ni | | | 0.25 | | | |
| Nickel 2-mercaptobenzothiazole, 15.3% Ni | | | | 0.25 | | |
| Nickel p-octylphenol sulfide, 6% Ni | | | | | 0.25 | |
| Nickel bis(2-ethylhexylphosphite), 8.15% Ni | | | | | | 0.25 |
| Initial color | (¹) | (²) | (²) | (³) | (⁴) | (¹) |
| Initial melt index of 20 mil samples at 230° C | 2.3 | 2.4 | 2.4 | 2.9 | 2.7 | 2.4 |
| After 4 months | 4.6 | 2.4 | 2.5 | (⁵) | 3.7 | 2.7 |
| After 7 months | 10.7 | 5.1 | 5.5 | (⁵) | 6.8 | 6.8 |
| After 9 months | 55.3 | 12.7 | 14.2 | (⁵) | 10.8 | 7.3 |

¹ Colorless.  ² Pale green.  ³ Brown.  ⁴ Green.  ⁵ Completely degraded.

The above data clearly indicate that the nickel bis-(2-ethylhexyl phosphite) greatly increased the resistance of the polymer to degradative deterioration, especially after prolonged exposure for nine months to light and air. The light and heat stability were superior to the Controls B to E, inclusive, the polymers stabilized by the other nickel stabilizers.

Examples 2 to 5

Polypropylene was stabilized against light deterioration solely by the addition of a nickel organophosphite of the invention. The amount of compound noted in Table II was weighed and dispersed by hand stirring in 100 parts of powdered previously unstabilized polypropylene (Profax 6501). This polymer as supplied had a melt index of 3.5 at 230° C. The mixture was placed on a 2-roll mill and fluxed for five minutes at 170±2° C. Color and melt index were noted, and then the mixture was held for thirty minutes at 315° C. in a mold press, after which color and melt index were again noted. The results are given in Table II.

does not. The nickel benzene phosphonite and phosphonate give good stabilization, but the color on exposure to high temperature deteriorates in the same manner as the nickel tert-octyl phenol sulifide.

Examples 6 to 9

Several nickel organophosphites in accordance with this invention in the amounts given in Table III which follows were weighed and dispersed by hand stirring in 100 parts of powdered previously unstabilized polypropylene (Profax 6501) together with 0.25 part of dilauryl thiodipropionate, 0.06 part of zinc 2-ethyl hexoate and 0.19 part of the product of the transesterification of one mole of triphenyl phosphite, 0.5 mole of 4,4'-n-butylidene-bis-(2-tert-butyl-5-methyl phenol), 2 moles of tridecyl alcohol and 0.9 g. of sodium hydroxide, transesterified at 110 to 170° C. for three hours. This polymer as supplied had a melt index of 3.5 at 230° C. The mixture so prepared was in each case placed on a 2-roll mill and fluxed for five minutes at 170±2° C. Pieces cut from the

TABLE II

| Example No. | Nickel Compound | Quantity, g. (per 100 g. Profax 6501) | Initial Color | Initial Melt Index | Final Color | Final Melt Index |
|---|---|---|---|---|---|---|
| 2 | Nickel bis(butyl phosphite) (16.3% Ni) | 0.43 | Colorless | 3.5 | Pale Yellow | 12.5 |
| 3 | Nickel bis(isooctyl phosphite) (13.3% Ni) | 0.43 | do | 3.3 | do | 29.9 |
| 4 | Nickel mononylphenyl phosphite (19.2% Ni) | 0.37 | do | 3.8 | Light Amber | 11.0 |
| 5 | Nickel bis(2-ethylhexyl phosphite) (8.15% Ni) | 0.86 | do | 3.4 | Very Pale Yellow | 11.8 |
| Control A | Nickel p-tert-octyl phenol sulfide (12.6% Ni) | 0.59 | Light Green | 2.6 | Dark Gray | >100 |
| Control B | Nickel benzene phosphonite (15.5% Ni) | 0.45 | Colorless | 3.2 | Black | 64 |
| Control C | Nickel benzene phosphonate (17.5% Ni) | 0.40 | do | 3.4 | Gray | 47.5 |

Polypropylene combined with the nickel organophosphite compounds has acceptable stability to processing at very high temperatures, while polypropylene combined with the nickel derivative of thiobis(p-tert-octylphenol)

milled sheet were (1) exposed to 315° C. in a press for one-half hour and (2) aged at 150° C. for twenty days. Melt index and color were noted before and after such exposure of the polymer.

TABLE III

| | Control A | Control B | Example No. 6 | 7 | 8 | 9 |
|---|---|---|---|---|---|---|
| Composition, Parts per Weight: | | | | | | |
| Profax 6501 | 100 | 100 | 100 | 100 | 100 | 100 |
| Dilauryl thiodipropionate | 0.25 | 0.25 | 0.25 | 0.25 | 0.25 | 0.25 |
| Zinc 2-ethylhexoate | 0.06 | 0.06 | 0.06 | 0.06 | 0.06 | 0.06 |
| Transerterified phenol phosphate | 0.19 | 0.19 | 0.19 | 0.19 | 0.10 | 0.19 |
| Nickel Compound: | | | | | | |
| Nickel bis(butyl phosphite) 16.3% Ni | | | 0.43 | | | |
| Nickel bis(isooctyl phosphite) 13.3% Ni | | | | 0.43 | | |
| Nickel mono-nonylphenyl phosphite 19.2% Ni | | | | | 0.37 | |
| Nickel bis(2-ethylhexyl phosphite) 8.15% Ni | | | | | | 0.86 |
| Nickel p-t-octylphenol sulfide 12.6% Ni | 0.59 | | | | | |
| Melt Index and Color: | | | | | | |
| Initial Melt Index | 2.8 | 2.1 | 2.3 | 2.4 | 2.8 | 2.6 |
| Initial Color | (¹) | (²) | (¹) | (¹) | (¹) | (¹) |
| Final Melt Index | 14.5 | >100 | 9.1 | 10.4 | 15.3 | 17.7 |
| Final Color | (⁴) | (⁴) | (³) | (³) | (⁵) | (³) |
| 150° C. Heat Aging, After 20 days | (⁶) | (⁶) | (⁶) | (⁶) | (⁶) | (⁶) |

¹ Colorless.  ² Light Green.  ³ Pale Yellow.  ⁴ Dark Gray.  ⁵ Light Gray.  ⁶ O.K.

The results of this set of experiments show that the nickel organophosphites have no ill effect on important properties of polypropylene such as color and maintenance of physical properties during processing at quite high temperatures, and during accelerated aging tests at 150° C.

Having regard to the foregoing disclosure, the following is claimed as the inventive and patentable embodiments thereof:

1. A stabilizer combination for use in improving the resistance of olefin polymers to deterioration in physical properties on exposure to light, consisting essentially of a nickel organophosphite having the formula

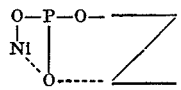

wherein one of the oxygens of the phosphite group is linked to nickel, one of the oxygens of the phosphite group is linked to Z, the other oxygen being linked either to nickel or to Z, and wherein Z is selected from the group consisting of hydrogen and organic radicals having from one to about thirty carbon atoms; and at least one other olefin polymer stabilizer selected from the group consisting of heat stabilizers selected from the group consisting of phenols, organo triphosphites, polyvalent metal salts of organic non-nitrogeneous monocarboxylic acids having from about six to about twenty-four carbon atoms, and thiodipropionates; and light stabilizers selected from the group consisting of 2-hydroxybenzophenones, 2,4,6-derivatives of 1,3,5-trithiane containing hydroxyl groups having phenolic character, 1-dioxides of α,β-benzoisothiazolones, o-hydroxyphenylbenzotriazoles, alkyl or aryl styryl ketones, 2-hydroxy aryl-1,3,5-triazines, hydroxy anilino-1,3,5-triazines and dialkyl hydroxybenzoic acids or esters.

2. A stabilizer combination in accordance with claim 1 consisting essentially of a nickel organophosphite and a phenol.

3. A stabilizer combination in accordance with claim 1 consisting essentially of a nickel organophosphite and a triphosphite.

4. A stabilizer combination in accordance with claim 1 consisting essentially of a nickel organophosphite and a polyvalent metal salt of an organic acid.

5. A stabilizer combination in accordance with claim 1 consisting essentially of a nickel organophosphite and a thiodipropionate.

6. A stabilizer combination in accordance with claim 1 consisting essentially of a nickel organophosphite and a 2-hydroxybenzophenone.

7. A stabilizer combination in accordance with claim 1 in which the nickel organophosphite has at least one bivalent nickel atom ionically linked through oxygen to phosphorus, and having, per phosphite group, at least one organic radical linked through oxygen to phosphorus, and at least one acidic hydrogen atom.

8. A stabilizer combination in accordance with claim 1 in which the nickel organophosphite has at least one bivalent nickel atom ionically linked through two oxygens to a single phosphorus, and at least one organic radical linked through oxygen to phosphorus.

9. A stabilizer combination in accordance with claim 1 in which the nickel organophosphite has at least one bivalent nickel atom ionically linked through oxygen to phosphorus, and at least one organic radical including a phenolic hydroxyl group linked through oxygen to phosphorus.

10. An olefin polymer composition having improved resistance to deterioration upon exposure to light, comprising an olefin polymer and a nickel organophosphite having the formula

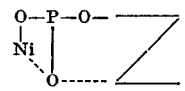

wherein one of the oxygens of the phosphite group is linked to nickel, one of the oxygens of the phosphite group is linked to Z, the other oxygen being linked either to nickel or to Z, and wherein Z is selected from the group consisting of hydrogen and organic radicals having from one to about thirty carbon atoms.

11. An olefin polymer composition in accordance with claim 10 in which the olefin polymer is a propylene polymer.

12. An olefin polymer composition in accordance with claim 11 in which the propylene polymer is polypropylene.

13. An olefin polymer composition in accordance with claim 12 wherein the nickel organophosphite contains at least one acidic hydrogen atom.

14. An olefin polymer composition in accordance with claim 12 wherein the nickel organophosphite contains a bivalent nickel atom ionically linked through two oxygens to a single phosphorus, and at least one organic radical linked through oxygen to phosphorus.

15. An olefin polymer composition in accordance with claim 12 wherein the nickel organophosphite contains at least one organic radical including a phenolic hydroxyl group linked through oxygen to phosphorus.

References Cited

UNITED STATES PATENTS 3,312,658    4/1967    Kamijo et al. _____ 260—45.75

DONALD E. CZAJA, *Primary Examiner.*

V. P. HOKE, *Assistant Examiner.*

UNITED STATES PATENT OFFICE
CERTIFICATE OF CORRECTION

Patent No. 3,395,112                                              July 30, 1968

Otto S. Kauder

It is certified that error appears in the above identified patent and that said Letters Patent are hereby corrected as shown below:

Column 2, line 13, "brown)" should read -- brown --; line 39, "sufones" should read -- sulfones --; line 48, "sufides" should read -- sulfides --. Column 4, line 13, "the" should read -- these --. Column 5, line 61, "p-(1(2-hydroxy-4-methyl" should read -- p-(1-(2-hydroxy-4-methyl --. Column 6, line 7, "mon-t-" should read -- mono-t- --; line 33, after "phosphite)" insert a period. Column 7, formula (8), the bottom of the first part of the formula before the bracket "$CH_4$" should read -- $CH_2$ -

Column 11, line 2 of second Table, "$NiC_2 \cdot 6H_2O$" should read -- $NiCl_2 \cdot 6H_2O$ --. Columns 13 and 14, formula of Example L of the first Table should appear as shown below:

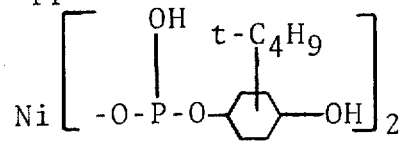

same columns, formula of Example O should appear as shown below:

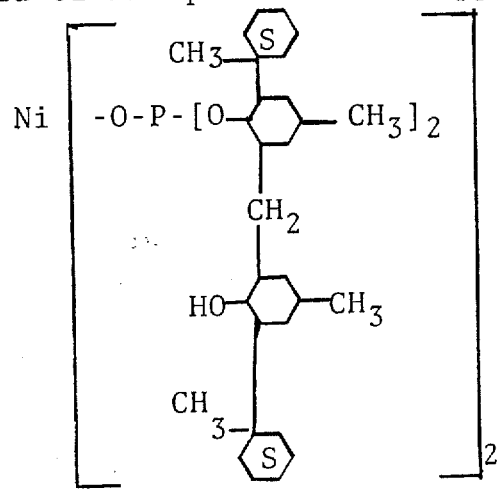

3,395,112
(2)

Column 15, line 44, "chlrododecynyl" should read -- chlorododecynyl --. line 48, "pentaerthrityl" should read -- pentaerythrityl --. Column 16, line 21, "-4-n-decycloxy-" should read -- -4-n-decyloxy- --; line 50, "-3-hxdroxy-" should read -- -3-hydroxy- --. Column 18, line 11, "2-(-2-,4-dihydroxyphenyl)" should read -- 2-(2,4-dihydroxyphenyl) --; same column 18, the last formula should appear as shown below:

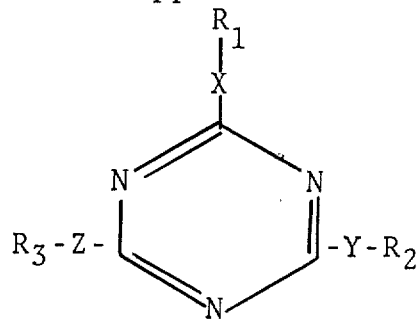

Column 19, line 21, "$R_1$ and $R_2$" should read -- $R_1$ or $R_2$ --; lin 43 and 44, "-oxanide" should read -- -oxamide --; line 63, "compound" should read -- component --. Column 20, line 36, "-$CH_2$," should read -- -$CH_2$-, --; lines 40 to 66, please insert comma at the end of each line of formula; line 72, after the la: formula insert a period. Column 21, lines 35 to 61, insert a sei colon, after each formula; lines 67 and 68, "organo phosphite triester" should read -- organic phosphite triester --. Column 23, line 8, "soribtyl" should read -- sorbityl --; lines 22 and 45, insert a semi-colon after formulae at the end of each line; lines 32 and 39, insert a comma after each formula; line 56, insert a period after the last formula. Columns 27 and 28, TABLE I, fourth column, line 5 thereof, "10.0" should read -- 0.10 --; same TABLE I, Control D, last three lines, footnote "(6)" should read -- (5) --. same columns 27 and 28, TABLE III, first column, line 5 thereof, "Transerterified" should read -- Transesterfied --; same TABLE III, sixth column, line 5 there "0.10" should read -- 0.19 --. Column 28, line 41, "o na" should read -- on a --.

Signed and sealed this 6th day of January 1970.

(SEAL)
Attest:

EDWARD M. FLETCHER, JR.
Attesting Officer

WILLIAM E. SCHUYLER, JR.
Commissioner of Patents